(12) United States Patent
Choi et al.

(10) Patent No.: US 11,994,173 B2
(45) Date of Patent: May 28, 2024

(54) CLUTCH PACK SYSTEM FOR TRANSMISSION

(71) Applicant: NEOOTO CO., LTD., Seoul (KR)

(72) Inventors: Duk Soon Choi, Chungcheongnam-do (KR); Sun Hyun Kim, Seoul (KR)

(73) Assignee: NEOOTO CO., LTD., Seoul (KR)

( * ) Notice: Subject to any disclaimer, the term of this patent is extended or adjusted under 35 U.S.C. 154(b) by 0 days.

(21) Appl. No.: 18/070,420

(22) Filed: Nov. 28, 2022

(65) Prior Publication Data
US 2023/0167859 A1    Jun. 1, 2023

(30) Foreign Application Priority Data

Nov. 29, 2021   (KR) .......................... 10-2021-0167657

(51) Int. Cl.
*F16D 13/52* (2006.01)
*F16D 23/14* (2006.01)
*F16D 28/00* (2006.01)
*F16H 63/30* (2006.01)
*F16D 23/12* (2006.01)

(52) U.S. Cl.
CPC ............. *F16D 23/14* (2013.01); *F16D 13/52* (2013.01); *F16D 28/00* (2013.01); *F16H 63/3043* (2013.01); *F16D 23/12* (2013.01); *F16D 2023/123* (2013.01); *F16H 2063/3059* (2013.01); *F16H 2063/3063* (2013.01)

(58) Field of Classification Search
CPC ........ F16D 23/14; F16D 13/52; F16D 13/648; F16D 2125/25; F16D 2125/42
See application file for complete search history.

(56) References Cited

U.S. PATENT DOCUMENTS

| 3,135,129 | A | * | 6/1964 | Merritt | ...................... F16H 3/14 |
| | | | | | 192/94 |
| 4,966,267 | A | * | 10/1990 | Carlton | ................... F16D 13/04 |
| | | | | | 192/48.91 |
| 5,503,602 | A | * | 4/1996 | Dick | .................. B60K 17/3462 |
| | | | | | 475/205 |
| 5,829,566 | A | * | 11/1998 | Winks | ................. F16D 25/0638 |
| | | | | | 192/70.14 |
| 6,468,170 | B1 | * | 10/2002 | Ito | ......................... F16H 63/067 |
| | | | | | 474/18 |
| 9,500,238 | B2 | | 11/2016 | Imafuku et al. | |

(Continued)

FOREIGN PATENT DOCUMENTS

DE   202015003605 U1 * 10/2015 ............. F16D 13/52
JP       2008249038 A  * 10/2008

(Continued)

OTHER PUBLICATIONS

Machine translation of DE202015003605U, retrieved from www.espacenet.com (Year: 2023).*

(Continued)

*Primary Examiner* — Stacey A Fluhart
(74) *Attorney, Agent, or Firm* — JCIPRNET

(57) ABSTRACT

A clutch pack system for transmission includes a push rod assembly, a clutch piston configured to transfer pressure received from the push rod assembly, a clutch friction plate configured to transfer pressure received from the clutch piston, and an outer hub connected to an outer drum by pressure from the clutch friction plate.

4 Claims, 5 Drawing Sheets

(56) References Cited

U.S. PATENT DOCUMENTS

2016/0097430 A1* 4/2016 Imafuku ................ F16D 13/54
                                                   192/18 B
2020/0096054 A1* 3/2020 Smith .................... B60K 17/34

FOREIGN PATENT DOCUMENTS

| JP | 2015218856 | 12/2015 |
| JP | 2016075361 | 5/2016 |

OTHER PUBLICATIONS

"Office Action of Korea Counterpart Application", dated Jul. 16, 2023, with English translation thereof, p. 1-p. 8.

* cited by examiner

CLUTCH PACK SYSTEM FOR TRANSMISSION

CROSS-REFERENCE TO RELATED APPLICATION

This application is based on and claims priority under 35 U.S.C. § 119 to Korean Patent Application No. 10-2021-0167657, filed on Nov. 29, 2021, in the Korean Intellectual Property Office, the disclosure of which is incorporated by reference herein in its entirety.

BACKGROUND

1. Field

Embodiments of the present disclosure relate to a clutch pack system for transmission.

2. Description of the Related Art

In general, a powertrain for an electric vehicle uses a single motor and a single speed reducer to control the rotational speed of a motor, or uses dual motors to change the speed and torque in a low-speed range and a high-speed range.

An electric vehicle using a single motor and a single speed reducer has low battery efficiency in the high-speed range and the low-speed range due to a fixed gear ratio. An electric vehicle using dual motors has different motors respectively operating in the high-speed range and the low-speed range and has low battery efficiency due to an increase in the vehicle weight and complexity of the system caused by an additional motor.

A transmission method for a powertrain for a partially multi-staged electric vehicle uses a synchronizer, a clutch gear, a synchronizer sleeve, a shift fork, and so on. During transmission, the synchronizer sleeve is moved by the shift fork, and the synchronizer is pushed to come into contact with a friction cone in the synchronizer to be synchronized therewith to engage with the clutch gear, and thus, power is transferred thereto.

In this case, the friction cone in the synchronizer has a friction area too small to transfer a strong torque of a shaft, thereby causing an insufficient synchronization, and thus, when the clutch gear is not engaged smoothly, a transmission portion may be damaged.

In addition, a lot of force is required for transmission, and the force may generate a strong friction force between the shift fork and the synchronizer sleeve rotating at a high speed, which may cause overheating, burning, or damage of the shift fork and the synchronizer sleeve.

SUMMARY

An object of the present disclosure is to provide a stable transmission function without damage to components.

However, the object is an example, and objects to be achieved by the present disclosure are not limited thereto.

Additional aspects will be set forth in part in the description which follows and, in part, will be apparent from the description, or may be learned by practice of the presented embodiments of the disclosure.

According to an embodiment of the present disclosure, a clutch pack system for transmission includes a push rod assembly, a clutch piston configured to transfer pressure received from the push rod assembly, a clutch friction plate configured to transfer pressure received from the clutch piston, and an outer hub connected to an outer drum by pressure from the clutch friction plate.

The clutch pack system for transmission according to the embodiment of the present disclosure may further include an actuator motor, a lead screw shaft connected to the actuator motor, and a screw rack gear configured to perform a linear motion by the lead screw shaft, wherein the screw rack gear may be connected to the push rod assembly.

In the clutch pack system for transmission according to the embodiment of the present disclosure, the clutch piston, the clutch friction plate, the outer drum, and the outer hub may be arranged on both sides of the push rod assembly, and the push rod assembly may apply pressure to the clutch piston by pushing a push rod pin.

In the clutch pack system for transmission according to the embodiment of the present disclosure, the outer drum may be fixed to a clutch pack case, and the outer hub may be coupled to a rotation shaft, and when the outer drum is connected to the outer hub, the rotation shaft may stop rotating.

The clutch pack system for transmission according to the embodiment of the present disclosure may further include a return spring between the clutch piston and the outer hub.

Other aspects, features, and advantages other than those described above will become apparent from the following detailed descriptions, claims and drawings for implementing the present disclosure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
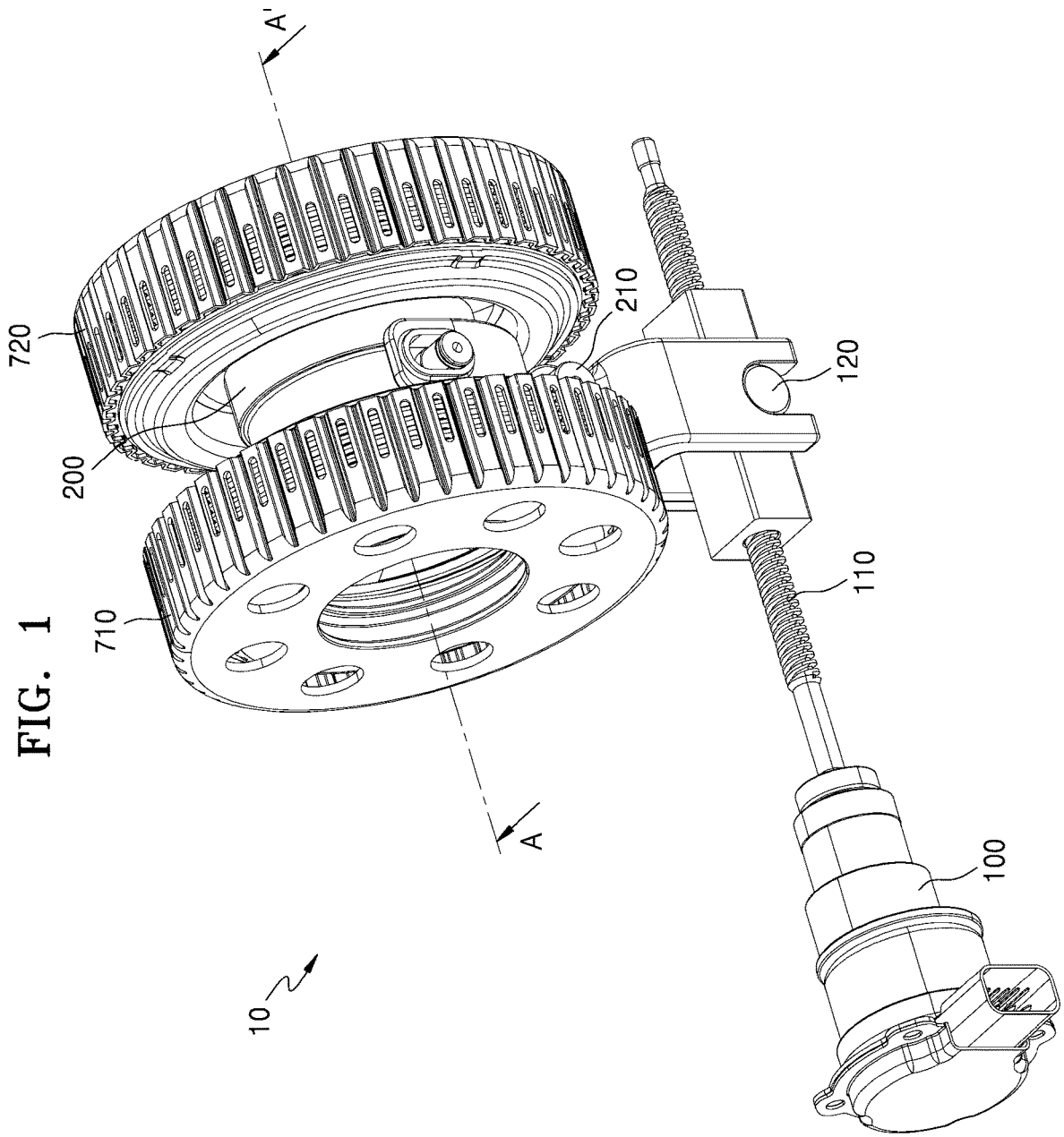
FIG. 1 is a perspective view illustrating a clutch pack system for transmission according to an embodiment of the present disclosure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

The present disclosure may be variously modified and may have various embodiments, and thus, various embodiments may be illustrated in the drawings and described in detail in the descriptions of the present disclosure. However, this does not limit the present disclosure to the various embodiments, and it should be understood to include all modifications, equivalents, and substitutes included in the idea and scope of the present disclosure. In describing the present disclosure, even though the same components are illustrated in other embodiments, the same identification numbers are used for the same components.

Hereinafter, embodiments of the present disclosure will be described in detail with reference to the accompanying drawings, and when described with reference to the drawings, the same or corresponding components are given the same reference numerals, and redundant descriptions thereof are omitted.

In the following embodiments, terms such as first and second are used for the purpose of distinguishing one component from another component, not in a limiting sense.

In the following embodiments, the singular expression includes the plural expression unless the context clearly dictates otherwise.

In the following embodiments, terms such as include or have means that features or components described in the specification exist, and a possibility that one or more other features or components will be added is not excluded in advance.

In the drawings, sizes of the components may be exaggerated or reduced for the sake of convenience of description. For example, sizes and thicknesses of the components illustrated in the drawings are randomly indicated for the sake of convenience of description, and thus, the present disclosure is not limited to the illustration.

In the following embodiments, an x axis, an y axis, and a z axis are not limited to three axes on the Cartesian coordinate system and may be interpreted in a broad sense including the axes. For example, the x axis, the y axis, and the z axis may be orthogonal to each other, but may refer to different directions that are not orthogonal to each other.

When certain embodiments are otherwise practicable, a certain process sequence may be performed differently from the described sequence. For example, two processes described in succession may be performed simultaneously or may be performed in an order opposite to the order previously described.

Terms used in the present disclosure are only used to describe some embodiments and are not intended to limit the present disclosure. In the present disclosure, it should be understood that terms, such as "comprise", "include", or "have", designate that features, numbers, steps, operations, components, configuration elements, or combinations thereof described in the present disclosure exists, and the presence or the possibility of addition of one or more other features, numbers, steps, operations, components, configuration elements, or combinations thereof are not precluded in advance.

Hereinafter, a structure and an operation of a clutch pack system for transmission according to an embodiment of the present disclosure will be described with reference to FIGS. 1 to 5.

Figure 2:
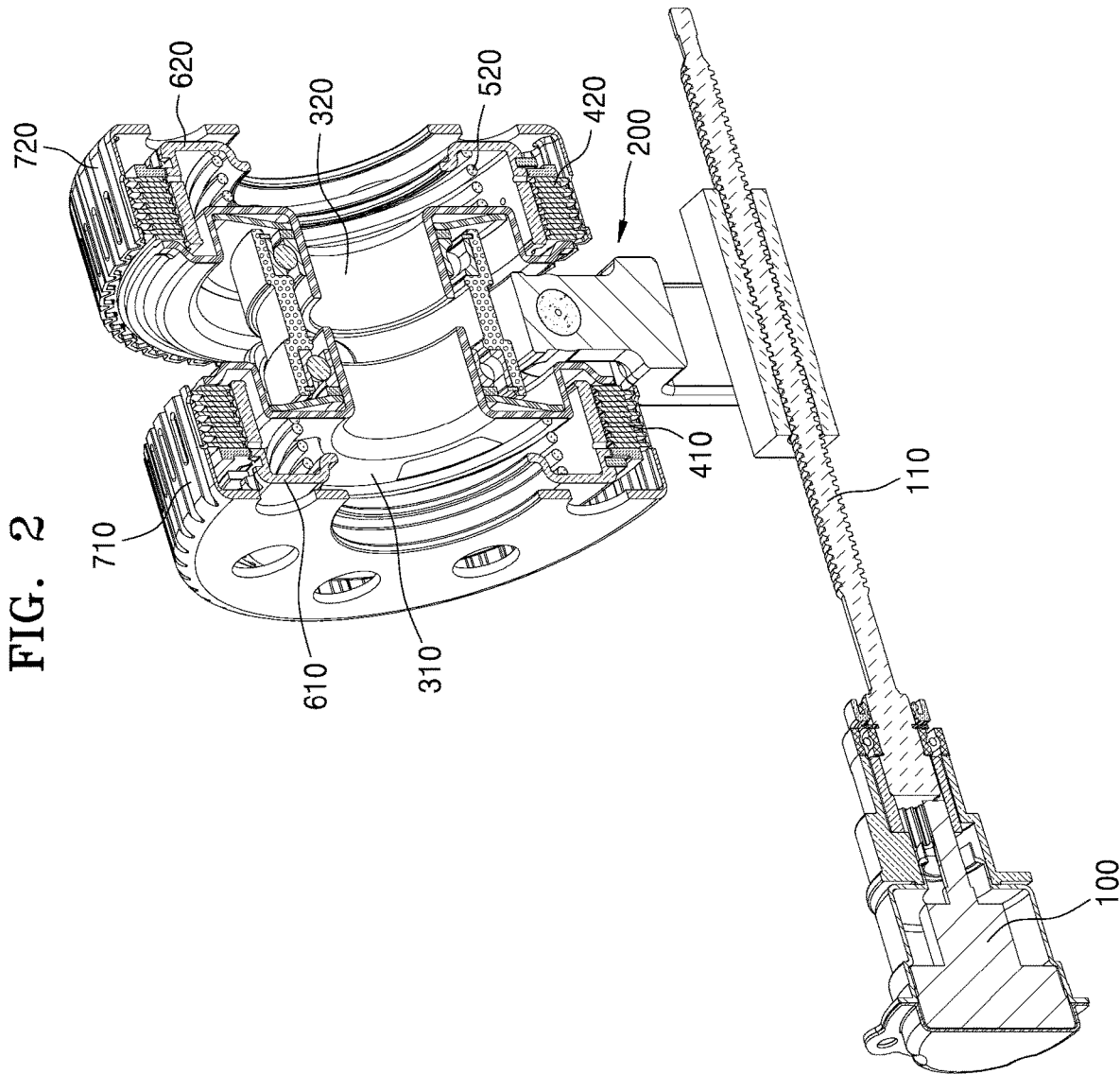
FIG. 2 is a cross-sectional view taken along line A-A' of the clutch pack system for transmission illustrated in FIG. 1.
Figure 3:
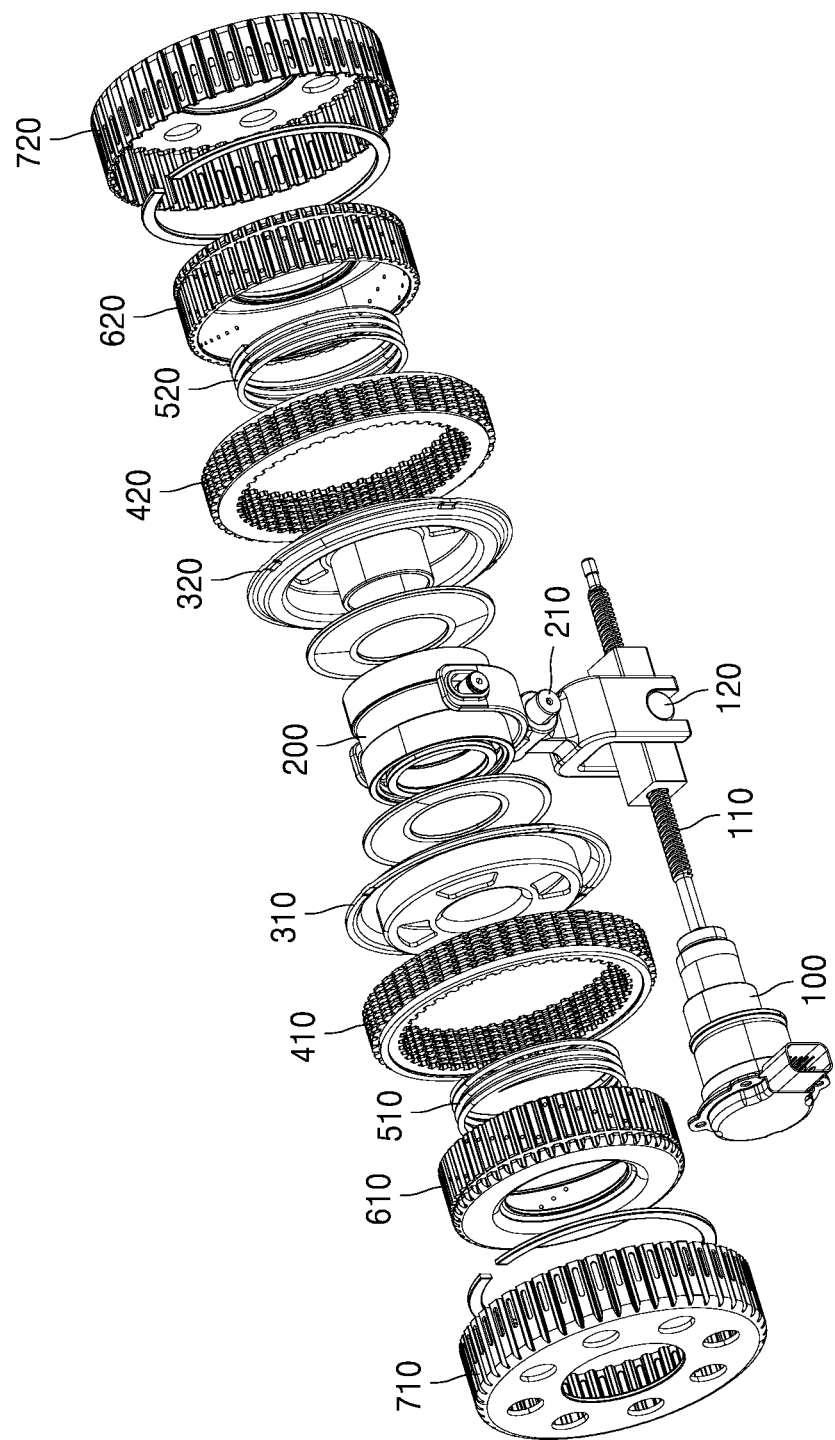
FIG. 3 is an exploded perspective view of a clutch pack system for transmission according to an embodiment of the present disclosure.
Figure 4:
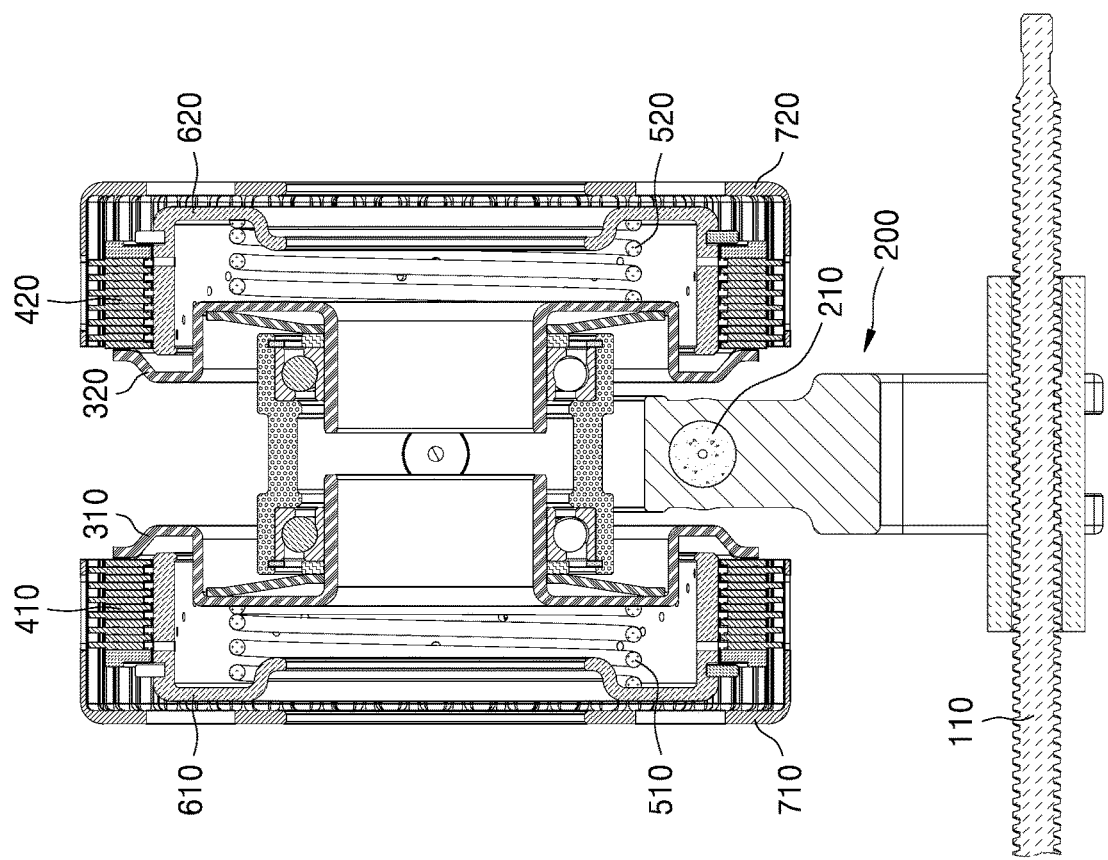
FIG. 4 is a cross-sectional view illustrating a neutral state of a clutch pack system for transmission according to an embodiment of the present disclosure.
Figure 5:
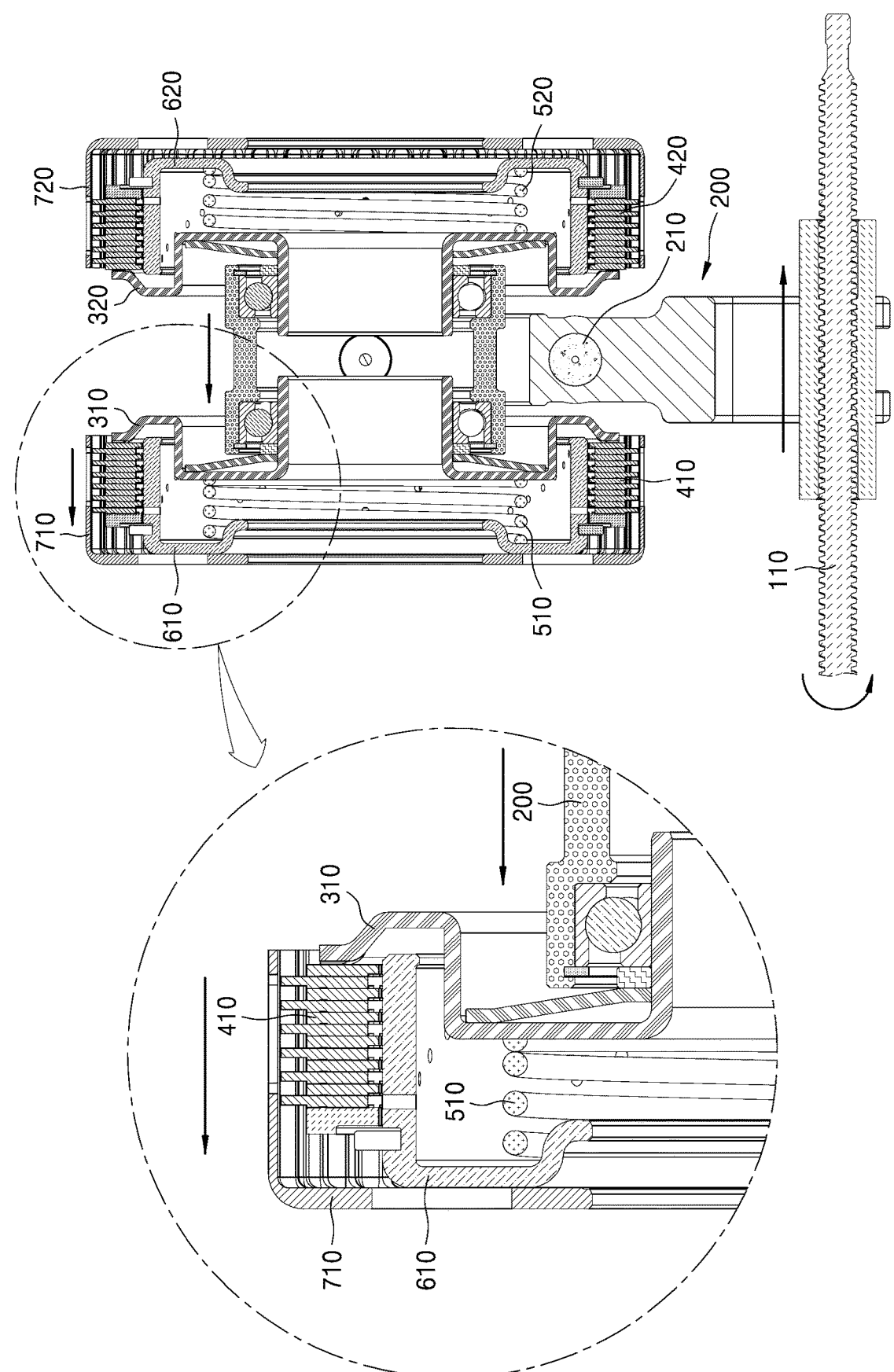
FIG. 5 is a cross-sectional view illustrating a first-stage fastening state of a clutch pack system for transmission according to an embodiment of the present disclosure.

FIG. 1 is a perspective view illustrating a clutch pack system for transmission according to an embodiment of the present disclosure. FIG. 2 is a cross-sectional view taken along line A-A' of the clutch pack system for transmission illustrated in FIG. 1. FIG. 3 is an exploded perspective view of the clutch pack system for transmission according to the embodiment of the present disclosure. FIG. 4 is a cross-sectional view illustrating a neutral state of the clutch pack system for transmission according to the embodiment of the present disclosure. FIG. 5 is a cross-sectional view illustrating a first-stage fastening state of the clutch pack system for transmission according to the embodiment of the present disclosure.

Referring to FIGS. 1 to 5, the clutch pack system for transmission according to the embodiment of the present disclosure includes a push rod assembly 200, clutch pistons 310 and 320 that transfer pressures received from the push rod assembly 200, clutch friction plates 410 and 420 that respectively transfer pressures received from the clutch pistons, and outer hubs 610 and 620 respectively connected to outer drums 710 and 720 through pressures from the clutch friction plates 410 and 420.

In addition, the clutch pack system for transmission may include an actuator motor 100, a lead screw shaft 110 connected to the actuator motor 100, and a screw rack gear 120 that linearly moves by the lead screw shaft 110, and the screw rack gear 120 may be connected to the push rod assembly 200.

When transmission is fastened by a clutch operation according to an embodiment of the present disclosure, the actuator motor 100 may operate, and the lead screw shaft 110 connected to the actuator motor 100 may rotate. The screw rack gear 120 connected to the lead screw shaft 110 may move linearly by converting a rotational motion of the lead screw shaft into a linear motion.

The screw rack gear 120 may provide pressure to the push rod assembly 200 through linear movement. In this case, the push rod assembly 200 may apply pressure to the clutch pistons 310 and 320 by moving through a lever motion around the push rod pin 210 by using the push rod pin 210 in the center thereof as an action point of force.

The clutch pistons 310 and 320 receiving pressures may respectively provide the pressures to the clutch friction plates 410 and 420, and the clutch friction plates 410 and 420 respectively receiving pressures from the clutch pistons 310 and 320 may respectively move the outer hubs 610 and 620 to fix the outer hubs 610 and 620 respectively connected to inner saw teeth of the clutch friction plates 410 and 420 and the outer drums 710 and 720 respectively connected to outer saw teeth of the clutch friction plates 410 and 420.

In this case, the outer drums 710 and 720 are fixed to a clutch pack case (not illustrated), and the outer hubs 610 and 620 are coupled to rotation shafts (not illustrated). Therefore, while the outer hubs 610 and 620 are rotated by the rotation shafts, when the outer hubs 610 and 620 are respectively connected to the outer drums 710 and 720, rotations of the rotation shafts may top while the outer hubs 610 and 620 are respectively fixed by the outer drums 710 and 720.

In addition, when a system neutral operation is performed by the clutch operation according to an embodiment of the present disclosure, the actuator motor 100 may operate in a reverse direction, and the lead screw shaft 110 connected to the actuator motor 100 may also rotate in the reverse direction.

In this case, the lead screw shaft 110 may provide power to the screw rack gear 120, and the screw rack gear 120 may move linearly to operate the push rod assembly 200 such that the push rod assembly 200 is located at the exact center of the clutch pack system for transmission.

The pressures applied to the clutch pistons 310 and 320 may be released by causing the push rod assembly 200 to be located at the exact center of the clutch pack system for transmission, and the clutch friction plates 410 and 420 may release coupling between the outer hubs 610 and 620 and the outer drums 710 and 720 as the outer hubs 610 and 620 are pushed in a direction opposite to a direction in which the outer drums 710 and 720 are located by return springs 510 and 520. While the outer hubs 610 and 620 and the outer drums 710 and 720 respectively fixed by the clutch friction plates 410 and 420 are released, the shafts respectively coupled to the outer hubs 610 and 620 may rotate thereby.

The clutch pistons 310 and 320, the clutch friction plates 410 and 420, the return springs 510 and 520, the outer hubs 610 and 620, and the outer drums 710 and 720 may be symmetrically arranged on both sides of the push rod assembly 200.

That is, the clutch pistons 310 and 320 may include first and second clutch pistons 310 and 320, the clutch friction plates 410 and 420 may include first and second clutch friction plates 410 and 420, the return springs 510 and 520 may include first and second return springs 510 and 520, the outer hubs 610 and 620 may include first and second outer hubs 610 and 620, and the outer drums 710 and 720 may include first and second outer drums 710 and 720.

As described above, there may be provided a system in which a clutch pack system for transmission stops an inner shaft and an outer shaft that rotate symmetrically in an axial direction to perform transmission by stopping rotations of first-stage and second-stage sun gears respectively connected to the inner shaft and the outer shaft.

According to an embodiment of the present disclosure, there is provided a structure in which power generated by the actuator motor 100 is transferred to the push rod assembly 200 through the lead screw shaft 110 and the screw rack gear 120 that performs a linear motion, and there is an advantage in that there is no being pushed after transmission is fastened.

In addition, sufficient pressures are applied to the clutch pistons 310 and 320 even with a small force through the push rod assembly 200 that pushes the clutch pistons 310 and 320 by using the principle of a lever, and thus, there is an advantage that the clutch friction plates 410 and 420 may be compressed.

In addition, by configuring a first stage, a neutral stage, and a second stage symmetrically around the push rod assembly 200, power transfer may be interrupted in a neutral position, and thus, stability may be obtained even when a traction motor is abnormal.

A clutch pack system for transmission according to an embodiment of the present disclosure may ensure stability and durability because there is no risk of burning, heat generation, or damage compared to the known synchronizer method.

In addition, a clutch pack system for transmission according to an embodiment of the present disclosure may ensure reliability because there is no being pushed when transmission is fastened by a lead screw and a rack gear.

In addition, a clutch pack system for transmission according to an embodiment of the present disclosure may be easily manufactured by applying the known multi-plate clutch technology, easily assembled to the clutch pack system, and manufactured in various sizes.

In addition, a clutch pack system for transmission according to an embodiment of the present disclosure may provide sufficient pressure with a small force by using the principle of a lever of a push rod pin in a push rod assembly.

In addition, a clutch pack system for transmission according to an embodiment of the present disclosure may have a faster transmission speed compared to a shift fork technology, ensure durability because synchronization is not required and transmission shock may be minimized, and safely brake when a traction motor is abnormal because power may be disconnected in a neutral position.

The technologies described in the embodiments are examples and do not limit the technical scopes of the embodiments. In order to concisely and clearly describe the descriptions of the present disclosure, descriptions of the known general technologies and configurations may be omitted. In addition, the connections or connection members of the lines between the components illustrated in the drawings exemplify functional connections and/or physical or circuit connections, and may be replaced in an actual device or represented by various additional functional connections, physical connections, or circuit connections. In addition, unless there are specific descriptions, such as "essential", "importantly", and so on, those may not be necessary components for the present disclosure.

The "above" or similar terms in the description and the claims of the present disclosure may refer to both the singular and the plural unless otherwise specified.

In addition, when a range is described in the embodiment, the range includes the disclosure to which individual values belonging to the range are applied (when there is no description to the contrary), and the range is the same as each individual value constituting the range in the description of the disclosure.

In addition, unless there is a clear description on an order of the steps constituting the method according to the embodiment or there is no description to the contrary, the steps may be performed in any suitable order. The embodiments are not limited according to the order of description of the above steps. All examples or example terminologies (for example, and so on) in the embodiments are merely for describing the embodiments in detail, and unless it is limited by the claims, the scopes of the embodiments are not limited by the examples or the example terminologies. In addition, those skilled in the art will recognize that various modifications, combinations, and changes may be made according to design conditions and factors within the scope of the appended claims or their equivalents.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A clutch pack system for transmission, the clutch pack system comprising:
   a push rod assembly;
   clutch friction plates configured to transfer pressures received from the push rod assembly;
   clutch pistons respectively disposed between the push rod assembly and one of the clutch friction plates, and configured to transfer the pressures received from the push rod assembly to clutch friction plates; and
   outer hubs respectively connected to outer drums by the pressures transferred from the clutch friction plates,
   wherein the clutch pistons, the clutch friction plates, the outer drums, and the outer hubs are symmetrically arranged on both sides of the push rod assembly, and the push rod assembly applies pressures respectively to the clutch pistons by moving through a lever motion around a push rod pin by using the push rod pin in a center of the push rod assembly between the pistons as an action point of force.

2. The clutch pack system of claim 1, further comprising:
an actuator motor;
a lead screw shaft connected to the actuator motor; and
a screw rack gear configured to perform a linear motion by the lead screw shaft,
wherein the screw rack gear is connected to the push rod assembly.

3. The clutch pack system of claim 1, wherein
the outer drums are fixed to a clutch pack case, and the outer hubs are respectively coupled to rotation shafts, and
when the outer drums are respectively connected to the outer hubs, the rotation shafts stop rotating.

4. The clutch pack system of claim 1, further comprising a return spring between one of the clutch pistons and one of the outer hubs.

\* \* \* \* \*